United States Patent [19]

Bray

[11] 4,095,664
[45] Jun. 20, 1978

[54] ELECTRIC MOTOR DRIVEN AUTOMOTIVE VEHICLE HAVING A MAGNETIC PARTICLE CLUTCH

[76] Inventor: George A. Bray, Rte. 1, Box 1227, Shingle Springs, Calif. 95628

[21] Appl. No.: 745,586

[22] Filed: Nov. 29, 1976

[51] Int. Cl.² .............................................. B60K 1/02
[52] U.S. Cl. ................................ 180/65 R; 180/65 C; 192/21.5; 290/45; 318/149
[58] Field of Search ................ 180/65 R, 65 A, 65 C, 180/65 D, 65 F, 65 E; 318/140, 149; 290/16, 45, 50; 192/21.5

[56] References Cited

U.S. PATENT DOCUMENTS

| | | | |
|---|---|---|---|
| 2,575,360 | 11/1951 | Rabinow | 180/65 R |
| 3,202,234 | 8/1965 | Osborne | 180/65 E |
| 3,374,849 | 3/1968 | Redman | 180/65 DD |
| 3,517,766 | 6/1970 | West | 180/65 C |
| 3,556,239 | 1/1971 | Spahn | 180/65 A |
| 3,719,881 | 3/1973 | Shibata et al. | 180/65 C |
| 3,861,485 | 1/1975 | Busch | 180/65 R |
| 3,874,472 | 4/1975 | Deane | 180/65 C |
| 3,889,127 | 6/1975 | Shibata | 180/65 C |
| 3,923,115 | 12/1975 | Helling | 180/65 A |
| 4,042,056 | 8/1977 | Horwinski | 180/65 A |

Primary Examiner—David M. Mitchell
Attorney, Agent, or Firm—Mark C. Jacobs

[57] ABSTRACT

A power plant and drive system for an automotive vehicle includes a constant speed 120 volt 3 phase AC motor which is coupled to the drive shaft of the vehicle through a magnetic particle clutch. The 120 volt 3 phase AC motor receives energy from a 120 volt AC alternator which is coupled to the motor through a one to three phase converter and connected in tandem to three 12 V DC alternators. The system further includes a battery driven 12 volt DC motor and a 5 cubic inch gas motor. Some of the energy generated by the 12 volt DC alternators is used to recharge the batteries that power the 12 volt DC motor. In normal operation, the alternators are driven solely by the 12 volt DC motor; however, when the voltage in the batteries becomes lower than 6 volts the alternators are driven solely by the gas motor, thus allowing the batteries to recharge to their normal level. Speed control of the vehicle is achieved by varying the coupling strength of the magnetic particle clutch.

4 Claims, 1 Drawing Figure

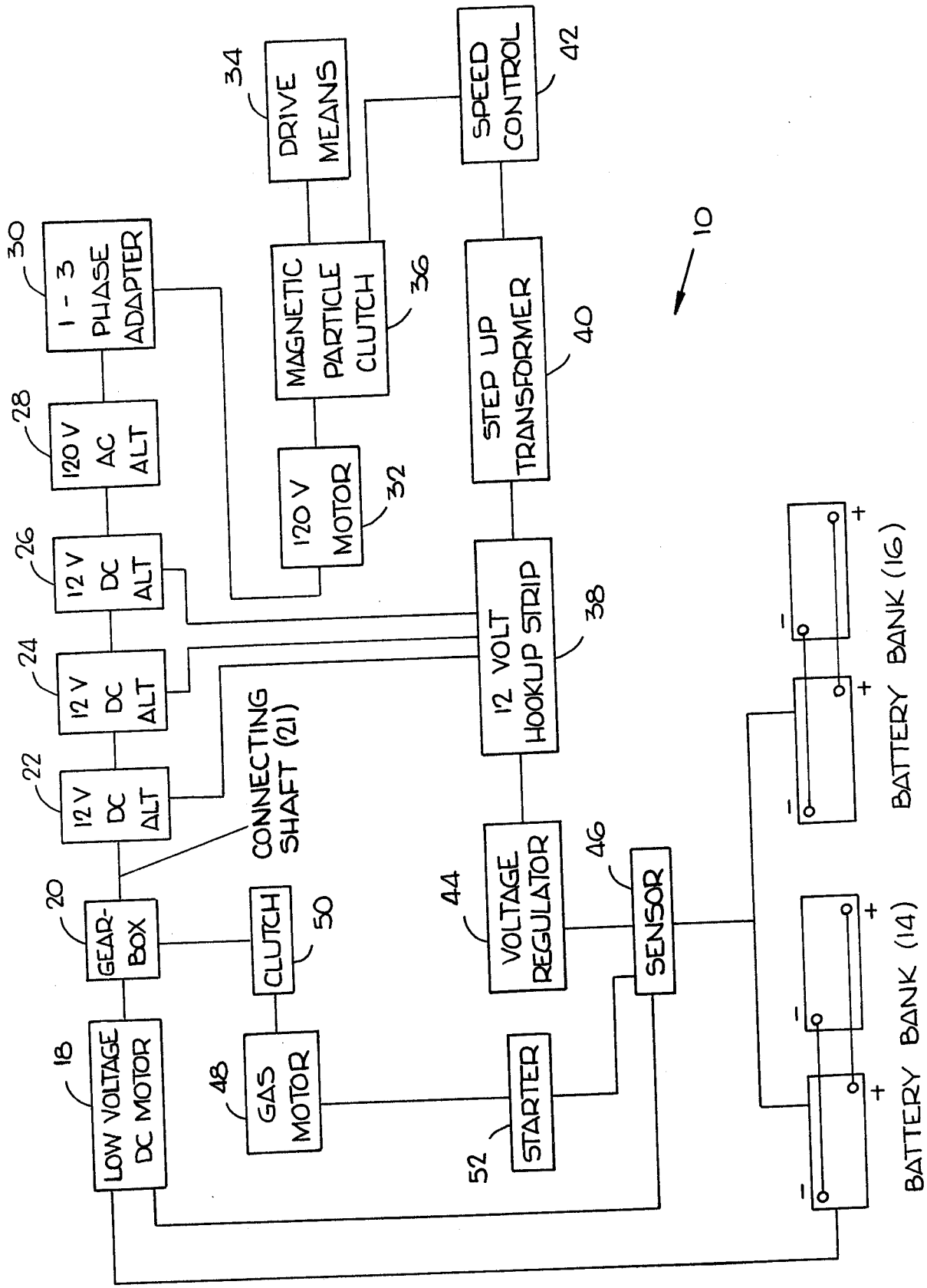

ELECTRIC MOTOR DRIVEN AUTOMOTIVE VEHICLE HAVING A MAGNETIC PARTICLE CLUTCH

BACKGROUND OF THE INVENTION

This invention relates to automotive vehicles. More particularly, this invention relates to electric motor driven automotive vehicles.

Most all electric motor driven automotive vehicles include an electric motor for generating mechanical energy and a transmitting mechanism, such as a clutch coupled to a transmission, for transmitting the mechanical energy generated by the motor to the drive shaft of the vehicle. Some types of electric motor driven automotive vehicles receive their electric power from an external source and some other types of electric motor driven automotive vehicles receive their electric power from batteries mounted on the vehicle.

In U.S. Pat. No. 2,974,769 there is disclosed a vehicle transmission system in which mechanical energy obtained from an internal combustion engine is connected through a magnetic particle clutch to a gear box which is coupled to the drive shaft of a vehicle. In U.S. Pat. No. 3,077,121 there is disclosed an automatic transmission control system for an automotive vehicle which includes a plurality of magnetic particle clutches. Other examples of transmission mechanisms employing magnetic clutches include U.S. Pat. No. 2,688,388 and U.S. Pat. No. 2,718,157.

In U.S. Pat. No. 3,845,835 there is disclosed an electric power plant for a land vehicle which includes an electric motor, for turning the drive shaft of the vehicle, two alternators also driven by the motor, a voltage regulator for the alternators and two sets of batteries charged alternately through the regulator. The battery that is not being charged energizes the motor. The alternators are connected to the drive axle of the vehicle. In U.S. Pat. No. 3,917,017 there is disclosed a battery operated vehicle drive system in which two sets of series connected batteries are alternately charged by an engine driven generator under control of a change-over selector. While one set of batteries is being charged the other set powers a drive motor for vehicle propulsion at a speed controlled by selection of power terminals in each battery set, at different voltage levels, from which the drive motor is energized. In U.S. Pat. No. 3,367,438 there is disclosed a power plant for an automotive vehicle which includes an internal combustion engine and an electric motor which are used alternatively as the motive power source for the vehicle.

SUMMARY OF THE INVENTION

It is an object of this invention to provide a new and improved system for generating mechanical energy and transmitting the mechanical energy so generated in a controlled manner to the drive shaft of an automotive vehicle.

It is another object of this invention to provide a new and improved power unit for generating mechanical energy to drive the drive shaft of an automotive vehicle.

It is still another object of this invention to provide a unit for generating mechanical energy for an automotive vehicle which includes an electric drive motor that is energized by an alternator driven primarily by a battery powered electric motor.

It is still another object of this invention to provide an energy generation and transmission system for an automotive vehicle which includes a motor coupled to the drive shaft of the vehicle through a magnetic particle clutch and wherein speed control of the drive shaft of the vehicle is exercised by varying the coupling strength of the magnetic clutch.

It is another object of this invention to provide a new and novel arrangement for generating electrical energy to power a constant speed electric motor coupled to the drive shaft of an automotive vehicle through a clutch.

It is still another object of this invention to provide a mechanical energy generating and transmitting system for an automotive Vehicle which includes a constant speed electric motor coupled to the drive shaft of the automotive vehicle through a magnetic clutch.

It is yet still another object of this invention to provide a novel arrangement for recharging a group of batteries used to supply electrical energy for energizing a constant speed electric motor.

It is another object of this invention to provide an electric motor drive system for an automotive vehicle which is primarily battery powered but which at certain instances is powered from a gas motor.

A system for generating and transmitting mechanical energy to the drive shaft of an automotive vehicle constructed according to this invention includes a mechanical energy generating unit which is coupled to the drive shaft of the automotive vehicle by means of a magnetic clutch. The mechanical energy generating unit includes a constant speed A.C. motor whose output shaft is coupled to the magnetic particle clutch. The constant speed A.C. motor is energized through an A.C. alternator which is driven primarily by a battery powered D.C. motor. The D.C. motor also drives some D.C. rectified alternators which are used to provide energy to recharge the batteries and energize the magnetic clutch. A small gas motor is detachably connected to the alternators in parallel with the small D.C. motor and is arranged to operate and supply drive power to the alternators only when the voltage in the batteries becomes lower than a predetermined level. Speed control of the drive shaft is obtained by varying the coupling strength of the magnetic particle clutch.

One of the important features of this invention is the idea of using a magnetic particle clutch coupled to a constant speed electric motor to produce a variable speed output. Another important feature of this invention is the idea of providing an electric motor power system which is primarily battery driven but which intermittently uses a small gas motor as a source of electric energy.

BRIEF DESCRIPTION OF THE DRAWING

In the drawings the sole FIGURE is a combination block diagram and electrical schematic diagram of a preferred embodiment of the invention. It depicts both a preferred embodiment of the power system of this invention, and also a useful drive mechanism powered by same.

DETAILED DESCRIPTION OF PREFERRED EMBODIMENT

Referring now to the FIGURE, there is shown a system 10 for generating mechanical energy and then transmitting the energy so generated in a controlled manner to the drive shaft of an automatic vehicle in which the sytem is mounted.

The system 10 includes two banks of batteries 14 and 16 connected in parallel. Each bank of batteries is made up of two 12 volt batteries connected in parallel to each other. The batteries supply electrical energy to a 12 volt D.C. motor 18 which is mechanically coupled through a gear box 20 to three 12 volt D.C. rectified alterators 22, 24 and 26 and one 120 volt A.C. alternator 28 connected in tandem. The 12 volt D.C. motor 18 serves as the primary source of power to drive the alternators. The output from the 120 V AC alternator 28 which is single phase power is connected into three phase power by means of a one to three phase adapter 30 and is then used to energize a 120 volt three phase A.C. constant speed motor 32. The output shaft of the motor 32 coupled to the drive shaft 34 of the automotive vehicle through a magnetic particle clutch 36. The output from the three 12 volt D.C. alternators is fed into a 12 volt hook-up strip 38 which is connected through a 1 : 2 step-up transformer 40 to a speed control unit 42 coupled to the magnetic particle clutch 36. The 12 volt hook-up strip 38 is also connected through a voltage regulator 44 and a sensor 46 to the batteries. Thus, the three 12 volt D.C. alternators are used to supply energy to recharge the batteries and also to energize the speed control unit. The system 10 further includes a 5 cubic inch gas motor 48 which is mechanically coupled to the gear box 20 through a clutch 50. When the voltage level in the voltage regulator 44 is more than 6 volts the gas motor is shut off and the clutch 50 is disengaged. When the voltage level in the voltage regulator 44 is less than 6 volts the sensor 46 initiates a starter 52 which turns on the gas motor 48, engages the clutch 50 and cuts off the power to the 12 volt D.C. motor 18. The speed control unit 42 is essentially a variable resistor which supplies a variable voltage of between 0 and 24 volts to the magnetic particle clutch 36. By altering the coupling strength of the magnetic particle clutch 36 the speed of rotation of the drive means, e.g. a shaft 34, is varied.

This invention is applicable for use in automobiles, golf carts, boardwalk chairs, wheel chairs, lift trucks, and other types of automotive vehicles; and also boats, in that they can be driven by the drive mechanism powered by the output of the 120 volt AC alternator 28, either by the magnetic particle clutch based system of this invention or by some other drive and speed control means. The advantage of the instant one, however, is that it is relatively low cost and is simple to manufacture, thus rendering it applicable to such devices as golf carts and boardwalk chairs.

While the above discussion has centered around a preferred embodiment power system and a preferred drive means for being powered by the former, the following generalizing comments should also be noted.

An alternative propulsion system to that shown would comprise mounting the motor 32 at the differential of the vehicle with the magnetic clutch 36 included therein for direct drive of the vehicle.

In order to have the inventive power system of this application operative at the highest capacity, the availability of an auxilliary battery charger is suggested. The reasons for its use are readily seen and understood by those skilled in the art.

The foregoing is considered as illustrative only of the principles of the invention. Further, since numerous modifications and changes will readily occur to those skilled in the art it is not desired to limit the invention to the exact construction and operation shown and described, and accordingly all suitable modifications and equivalents may be resorted to falling within the scope of the invention.

It is to be seen that two alternating sets of batteries are required in the power system of the preferred embodiment. The coordination is as follows:

For the coordination of two batteries and a gas motor, sensor 46 acts in a dual manner, first to select for the VR 44 which pair of batteries to charge such that the VR can operate as needed when pair #1 is at its minimum pre-determined charge, the sensor notes same and VR 44 kicks in. Battery pair #2 operates the electric motor until it wears down in its voltage, and at this point, sensor 46 recognizes same, and causes the starter 52 to kick on for the gas motor and to close the magnetic clutch 50 such that the gas motor 48 can become engaged and operative. When the gas motor 48 is operating the VR will simultaneously complete the charge of battery pair #1 and commence recharge of the pair #2. When #1 is complete the sensor will cause the gas to shut down and battery pair #1 will reactivate the electric motor 98.

Three sets of batteries can also be employed, with one set on operation, one on recharge, and the third awaiting recharge. The use of a sensing means to coordinate three battery sets instead of two is within the skill of the art. A battery bank may consist of one or more batteries in parallel. The gas motor's operation would be coordinated to the down time of the batteries.

From the drawing it is seen that clutch 50 is interposed between gear box 20 and gas motor 48. The clutch is disengaged to reduce the drag when the gasoline motor is not operating. However, since there is virtually no drag from an electric motor such as 18, no such clutch is employed. The gear box 20 is interconnected to a connecting shaft 21 which is mechanically coupled to the alternators in a known to the art mode.

While three 12V DC alternators are employed in the preferred embodiment, more or less can be utilized.

In like manner, the voltage of the 120 volt AC alternator is not critical. The only requirement is that the AC alternator's voltage match that of the motor it drives, which in the preferred embodiment is 120V AC. If a lower or higher voltage motor is employed the alternator for same should match it in voltage. In the same vein, the voltage of motor 18 should match the batteries and is not limited to 12 volts, which is preferred only because of easy availability.

The use of the phase adaptor to go from 1 to 3 phase is done for the purpose of economy, as a multiphase alternator is relatively inexpensive. The choice of a 120 V motor was deemed suitable for the intended purpose for the power system as recited herein, namely to power a drive system for a vehicle. Further to this point, it is seen that if the motor 32 chosen for the ultimate drive means is a DC motor that alternator 28 can be DC, provided that it is of the same voltage.

On another motor topic, while 48 is shown as a 5 cc inch motor, any low displacement gasoline engine such as from a chain saw can be employed. This is the minimum output. Also adaptable is a small 125 to 150 cc engine from a motor cycle with built in self starters. The thought is to have a reliable, easily energised gas motor for use during down time of the batteries.

I claim:

1. An electric motor power means suitable for boats, cars, and other vehicles, comprising:
    (a) a constant speed electric motor of predetermined voltageand current,
    (b) an alternator of the same predetermined voltage electrically connected to said constant speed motor (c) a plurality of rectified alternators of a separately predetermined voltage, (d) a DC motor coupled to the alternator (b) and to the DC rectified alternators to drive said alternator and said DC rectified alternators (e) a DC battery means connected to said DC motor wherein the output voltage of the battery means is the same as the voltage of the DC motor and the predetermined voltage of the DC rectified alternators (f) means to electrically connect the outputs of the DC alternators to the DC battery means to supply electrical energy back to recharge said battery means, and a drive shaft of said vehicle a magnetic particle clutch coupled between said constant speed motor and said drive shaft, and means for varying the coupling strength of the magnetic particle clutch; whereby variations in the coupling strength will produce variations in the speed of rotation of the drive shaft.

2. The power means of claim 1 futher including a voltage regulating means interposed and connected between the DC rectified alternators and the battery means.

3. The power means of claim 2 and further including an auxilliary gas motor and clutch for selectively coupling the gas motor to said alternator and said DC rectified alternators, and further including a sensing means coupled between the voltage regulator and the battery means for sensing when the voltage in the battery unit is less than the predetermined value, and said sensing means also connected to the gas motor and said clutch for initiating starting of said gas motor when the voltage of the battery means is less than said predetermined value.

4. The power means of claim 3 wherein the vehicle to be powered is an automobile.

* * * * *